US006558848B1

United States Patent
Kobayashi et al.

(10) Patent No.: US 6,558,848 B1
(45) Date of Patent: *May 6, 2003

(54) ELECTRODES FOR SECONDARY CELLS, PROCESS FOR THEIR PRODUCTION, AND SECONDARY CELLS HAVING SUCH ELECTRODES

(75) Inventors: Naoya Kobayashi; Soichiro Kawakami, both of Nara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/615,783

(22) Filed: Mar. 14, 1996

(30) Foreign Application Priority Data

Mar. 17, 1995 (JP) .............................. 7-058803
Mar. 7, 1996 (JP) .............................. 8-050127

(51) Int. Cl.⁷ .............................................. H01M 4/70
(52) U.S. Cl. ........................ 429/241; 429/233; 429/235
(58) Field of Search .................... 429/233, 235, 429/236, 241, 245, 218

(56) References Cited

U.S. PATENT DOCUMENTS

| 2,724,733 A | * | 11/1955 | Hagspihl et al. | |
| 3,272,654 A | * | 9/1966 | Lang | |
| 3,787,244 A | * | 1/1974 | Schulmeister et al. | 136/120 FC |
| 3,862,862 A | * | 1/1975 | Gillibrand et al. | 136/148 |
| 4,251,603 A | * | 2/1981 | Matsumoto et al. | 429/235 |
| 4,283,844 A | * | 8/1981 | Milden et al. | 29/623.5 |
| 4,460,666 A | | 7/1984 | Dinkler et al. | 429/236 |
| 5,162,178 A | * | 11/1992 | Ohsawa et al. | 429/218 |
| 5,436,091 A | * | 7/1995 | Shackle et al. | 429/218 |
| 5,491,037 A | | 2/1996 | Kawakami | 429/49 |
| 5,554,460 A | * | 9/1996 | Wu et al. | 429/218 |
| 5,588,971 A | * | 12/1996 | Fauteux et al. | 29/623.5 |
| 5,591,544 A | * | 1/1997 | Fauteux et al. | 429/209 |
| 5,798,190 A | * | 8/1998 | Andrei et al. | 429/192 |
| 5,846,675 A | * | 12/1998 | Sazhin et al. | 429/245 |

FOREIGN PATENT DOCUMENTS

| GB | 2018496 | 10/1979 | .......... H01M/10/39 |
| JP | 2-102661 | 8/1990 | |
| JP | 7-6765 | 1/1995 | |

OTHER PUBLICATIONS

Yazami, in "Lithium Batteries New Materials, Developments and Perspectives", G. Pistoia, ed. Elsevier Science, pp. 49–51. No month available, 1994.*
Kittel, "Introduction to Solid State Physics, 6th edition" John Wiley and Sons, p. 76. No Month available, 1986.*
Metal Finishing Guidebook and Directory, Metals and Plastics Publications, Inc 48th edition. (no month available), 1980.*
Journal of the Electrochemical Society, vol. 117, No. 2, Feb. 1970, "The Electrochemical . . . Graphite", pp. 222–224.

* cited by examiner

*Primary Examiner*—Carol Chaney
(74) *Attorney, Agent, or Firm*—Fitzpatrick, Cella, Harper & Scinto (57) ABSTRACT

A secondary cell having a long cycle lifetime and a superior charge and discharge performance is provided with an electrode having a collector having a metal matrix 301 having micropores 302 with an average diameter not larger than 3 microns. The micropores 302 is formed by utilizing reduction reaction of a metal.

19 Claims, 5 Drawing Sheets

NICKEL FOIL AFTER
OXIDATION-REDUCTION

FIG. 6B

UNTREATED NICKEL FOIL

ELECTRODES FOR SECONDARY CELLS, PROCESS FOR THEIR PRODUCTION, AND SECONDARY CELLS HAVING SUCH ELECTRODES

BACKGROUND OF THE INVENTION

1. Field of the invention

This invention relates to an electrode for a secondary cell, a process for its production, and a secondary cell having such an electrode. More particularly, it relates to electrodes for secondary cells as typified by a lithium secondary cell employing lithium in the negative electrode, a lithium secondary cell employing lithium-transition metal in the positive electrode, a nickel-zinc secondary cell or bromine-zinc secondary cell employing zinc in the positive electrode and a nickel-cadmium cell or nickel-hydrogen cell employing nickel hydroxide in the positive electrode, a process for producing such electrodes, and a secondary cell having such electrodes.

2. Related Background Art

In recent years, it is foreseen that the greenhouse effect due to an increase in $CO_2$ in the atmosphere will cause a rise of the earth's surface temperature. Additional construction of thermal power plants that generate electricity by utilizing energy produced by burning what is called fossil fuels such as petroleum and coal has become difficult because the combustion of such fuels is accompanied by $CO_2$ emissions and because substances other than $CO_2$, such as nitrogen oxides $NO_x$ and hydrocarbons, which are said to cause air pollution are released to the atmosphere. In addition, rated operation is preferable in order to control as far as possible the quantity of release of the substances said to cause air pollution. It is also difficult to vary the amount of electricity generation in a short time. Accordingly, under existing circumstances, the electricity is generated so as to be adapted to the daytime, during which power consumption increases, and much of electricity thus generated is wasted without being used. Now, as effective utilization of generated electric power, it is proposed to employ what is called load leveling, which is to store nighttime electric power in secondary cells equipped in homes and so forth so as to level the load.

In the field of electric cars that may discharge no air-pollutive substances when driven, the advent of secondary cells with a long cycle lifetime and a high energy density is long-awaited also in order to provide a substitute for conventional internal combustion engines such as gasoline engines and diesel engines.

The advent of secondary cells with a long cycle lifetime and a high energy density is also long-awaited as power sources of portable machinery such as personal computers, word processors, video cameras and portable telephones.

As compact, light-weight and high-performance secondary cells, JOURNAL OF THE ELECTROCHEMICAL SOCIETY 177, 222 (1970) has reported an example in which a lithium-graphite interlayer compound is applied to the negative electrode of secondary cells. Since then, there has been progress in the development of, for example, what is called "lithium ion cells", which are rocking chair type secondary cells employing carbon as a negative electrode active material, as an interlayer compound incorporated with lithium ions, and as a positive electrode active material where lithium is stored by intercalating it between layers of carbon by the reaction of charging. Some of these cells are being put into practical use. In lithium ion cells, the host material carbon that intercalates lithium between layers as the guest is used in the negative electrode to thereby prevent the dendrite growth of the lithium at the time of charging so that a long lifetime can be achieved in the charging-discharging cycle.

However, in lithium ion storage cells employing carbon as the host material of the negative electrode at which lithium is intercalated, the discharge capacity that can be stably taken out while repeating charging and discharging for a long time is at most the quantity of electricity corresponding to one lithium atom per ten carbon atoms. No cells have been available which can exceed the theoretical capacity of graphite capable of intercalating one lithium atom per six carbon atoms.

Lithium-transition metal oxides in which lithium has been intercalated are also mainly employed as positive electrode active materials of the above lithium ion storage cells. In practice, however, only 40 to 60% of the theoretical capacity is utilized.

Moreover, even in such lithium ion storage cells, lithium may be locally dendrite-deposited on the negative electrode surface when the cells are charged at a great electric current (i.e., charged at a high rate), to cause an internal short, resulting in a lowering of cycle lifetime in some cases.

In storage cells employing zinc in the negative electrode, for example, nickel-zinc storage cells, the zinc may also be dendrite-deposited when charged, which will tend to cause an internal short, providing a cause of obstructing the elongation of cycle lifetime.

The present inventors have presumed that the cause of the problems in the lithium ion storage cells and nickel-zinc storage cells is a low capacity of the collector of an electrode to collect electrons from an active material layer. In order to improve the electron collecting ability of the collector by increasing the surface area of the collector, they have taken note of nickel powder sintered material substrates or foam nickel substrates, employed in collectors of nickel-cadmium storage cells and nickel-hydrogen-occluded alloy storage cells, which are alkaline secondary cells, and have attempted to apply these to the electrodes of the lithium ion storage cells or nickel-zinc storage cells. Here, the nickel powder sintered material substrates are those formed by coating a slurry of a mixture of nickel powder, an organic binder and water on a nickel-plated porous thin steel plate (a core material), followed by sintering, and have an average pore size of 6 to 12 microns and a porosity of 78 to 82%. The foam nickel substrates are those formed by chemically or physically forming a nickel metal coating on the surface of a sheet-like polymeric resin such as urethane foam, having a three-dimensional network structure, and baking the coating to remove the resin, followed by sintering treatment, and have an average pore size of 100 to 300 microns and a porosity of 92 to 96%.

However, as a result of the attempt, both the nickel powder sintered material substrates and the foam nickel substrates were found to have a large thickness. Since the thickness of electrodes can not be made small, the electrode area can not be enlarged in a cell housing having a limited volume. Thus, it was impossible to improve high-rate charging-discharging performance and discharge capacity as expected. Also, because of uneven surface in either of the nickel powder sintered material substrates and the foam nickel substrates, electric fields converged on some places at the time of charging, so that lithium or zinc tended to be dendrite-deposited. Thus, it was impossible to solve the problems involved in the secondary cells utilizing the reaction of lithium ions (hereinafter called lithium secondary cells) and the secondary cells employing zinc in the negative electrode (hereinafter called zinc secondary cells).

SUMMARY OF THE INVENTION

The present invention was accomplished taking account of the problems discussed above, and an object thereof is to provide an electrode for a secondary cell, having a long cycle lifetime, a high-energy density and superior performances; a process for its production; and a secondary cell having such an electrode.

Another object of the present invention is to provide an electrode that can prevent or control an increase in impedance of a negative electrode or a positive electrode which may be caused by charging and discharging; a process for its production; and a secondary cell having such an electrode.

Still another object of the present invention is to provide an electrode that can adhere to the active material and can be rapidly charged and discharged; a process for its production; and a secondary cell having such an electrode.

The present invention provides an electrode for a secondary cell, comprising at least a collector that retains an electrochemically active material participating in the cell reaction; wherein the collector comprises a porous metal having micropores with an average diameter not larger than 3 microns ($\mu$m).

The present invention also provides a secondary cell comprising at least a first electrode having an active material pertaining to cell reaction and a collector capable of retaining the electrochemically active material, a second electrode provided opposingly to the first electrode via an electrolyte and a separator, and a housing that holds these members; wherein the collector comprises a porous metal having micropores with an average diameter not larger than 3 microns ($\mu$m).

The present invention still also provides a process for producing an electrode for a secondary cell, the electrode having a collector capable of retaining an electrochemically active material; which the process comprises the step of reducing an oxidized metallic material to form the collector.

DESCRIPTION OF THE PREFERRED EMBODIMENTS

The present inventors made extensive studies in order to solve the problems discussed above. As a result, they have discovered that secondary cells having a long cycle lifetime and a high energy density can be obtained when the collector (s) of one or both of the negative electrode and the positive electrode is/are formed of a foil or plate of a porous metal in which a great number of micropores, with an average diameter not larger than 3 microns, are formed in the direction from the surface to the inside.

They have also discovered that, in order to form the micropores with an average diameter not larger than 3 microns, it is simple to utilize the reaction of oxidation-reduction.

In the present invention, a collector having a great number of micropores is used in an electrode, and hence an electrode having a large specific surface area can be obtained. Accordingly, the substantial current density of the electrode can be decreased, and hence the charging and discharging can be performed at a high charge and discharge rate. In other words, the electrodes of the present invention can pass higher currents than electrodes having the same size but having no pores. Hence it is possible to perform rapid charging and discharging at higher current. The electron collecting ability is also improved, and hence the chemical reaction of an electrochemically active material generated in the charging and discharging takes place with good efficiency, bringing about an improvement in utilization of the active material. Thus, a secondary cell comprising the electrode of the present invention may have a larger capacity.

Besides, since the collector having the micropores as described above has a large specific surface area and is porous, the negative electrode-active material and/or positive electrode-active material of the lithium secondary cells or alkaline secondary cells can be retained inside the minute pores or surface of the collector. This makes it possible to obtain an electrode having a smaller thickness and a larger surface area than the negative electrode or positive electrode of conventional lithium secondary cells or alkali secondary cells, and hence cells having a high capacity can be obtained. Since the specific surface area of the electrode can be made larger, the effective current density can be decreased, and the efficiency of charging and discharging can be improved especially when cells are rapidly charged and discharged. Also, the adhesion between the active material and the collector can be improved, and hence improvements can be obtained in the cycle lifetime, in the case when cells are rapidly charged and discharged, and in the efficiency of charging and discharging.

The present invention will be described below in detail with reference to the accompanying drawings.

Figure 1:
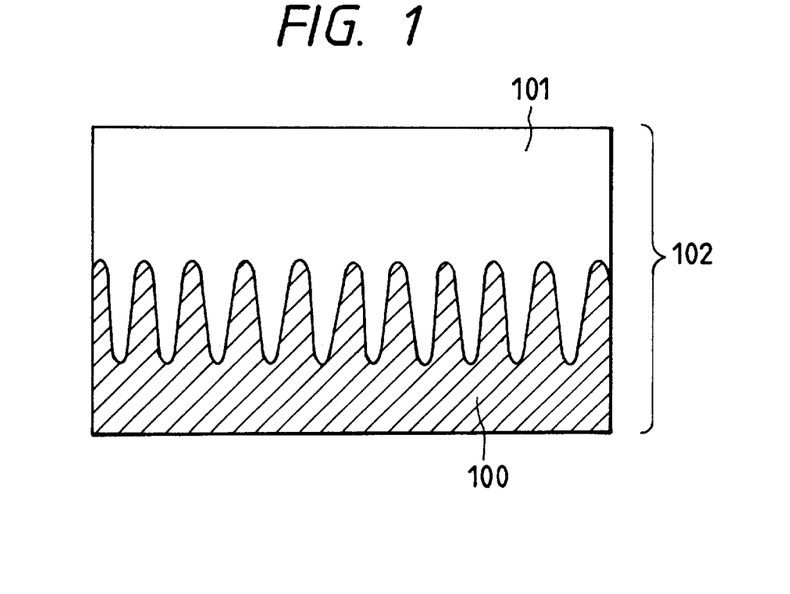
FIG. 1 is a schematic cross section to illustrate a preferred embodiment of the electrode structure of the present invention.
Figure 2:
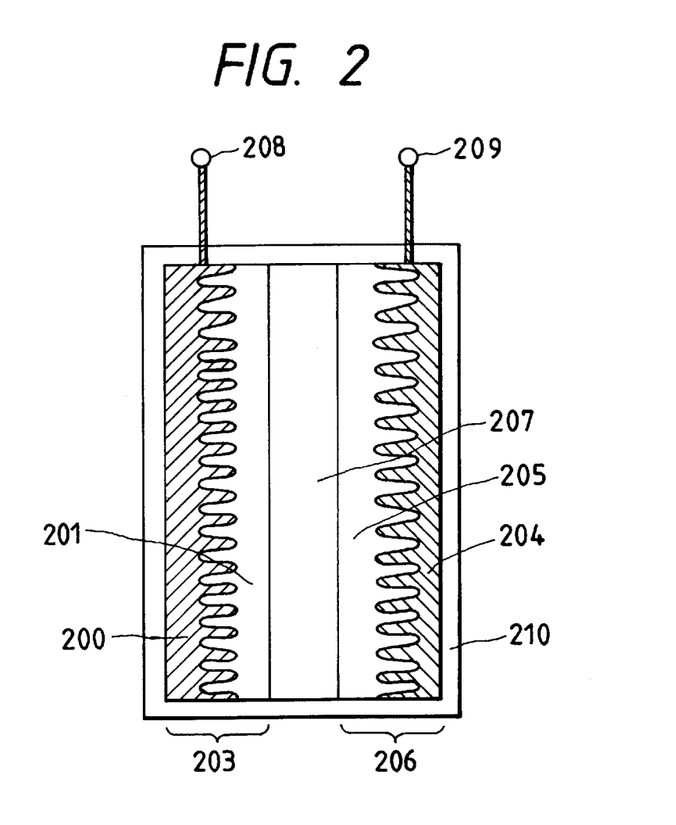
FIG. 2 is a diagrammatic cross section to schematically illustrate the construction of a secondary cell having the electrode shown in FIG. 1.
Figure 3:
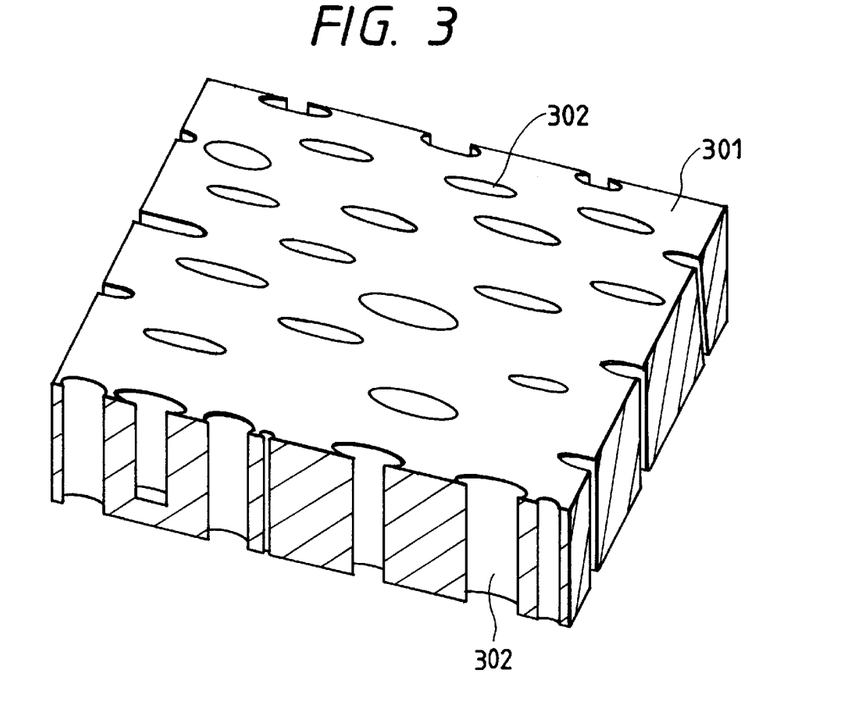
FIG. 3 is a schematic perspective view to illustrate a preferred embodiment of the collector used in the present invention.

FIG. 1 schematically cross-sectionally illustrates a preferred embodiment of the electrode (negative electrode or positive electrode) of the present invention. FIG. 2 schematically illustrates the construction of a preferred embodiment of the secondary cell of the present invention. FIG. 3 conceptionally illustrates the collector that constitutes the negative electrode or positive electrode of the present invention.

To describe the invention with reference to FIG. 1, an electrode (negative electrode or positive electrode) 102 of the present invention is formed of a collector 100 having the micropores with an average diameter not larger than 3 microns and, superposed thereon, an active material layer, 101, capable of retaining an electrochemically active material.

A secondary cell employing the electrode 102 shown in FIG. 1 in the negative electrode and the positive electrode is, as shown in FIG. 2, comprised of a negative electrode 203 having a negative electrode-active material 201 formed on a negative electrode collector 200, a positive electrode 206 having a positive electrode-active material 205 formed on a positive electrode collector 204, a separator 207 holding an electrolytic solution, held between the negative electrode 203 and the positive electrode 206, a negative electrode terminal 208, a positive electrode terminal 209, and a cell housing 210.

The present invention employs the collector having microscopic pores (micropores), and hence the substantial current density at the time of charging and discharging can be decreased, and the adhesion of the active material layers can be improved. Thus, in the secondary cell of the present invention, the high-rate charge-discharge performance, Coulomb efficiency of charging and discharging, and discharge capacity and cycle lifetime of cells can be improved.

Collector

The collector having micropores has the structure as conceptionally shown in FIG. 3, i.e., the structure having a great number of micropores 302 in a metal matrix 301.

The average pore diameter of the pores depends on production conditions as described later.

If the pore size is too large, the electric field may converge at pore wall edges and may tend to cause dendrite deposition of lithium or zinc at the time of charging and discharging, in the case of secondary cells containing lithium or zinc as the negative electrode-active material layer. Hence, the micropores may preferably be controlled to have an average pore diameter not larger than 3 microns, more preferably not larger than 2 microns, and still more preferably not larger than 1 micron. In order to form a collector having a high specific surface area, the micropores may preferably be present in such a density that the distance between individual pores is preferably 5 microns or less, and more preferably 3 microns or less. The collector may preferably have a specific surface area not smaller than 1 $m^2/g$, and more preferably not smaller than 10 $m^2/g$.

As illustrated in FIG. 3, the primary orientation of the micropores in the collector may preferably be in the direction perpendicular or substantially perpendicular to the main plane of the opposing positive or negative electrode.

The resistivity of foil- or plate-like original metallic material as a matrix is preferably $2\times10^{-5}$ $\Omega\cdot cm$ or below as a value at 20° C., in order to reduce a collecting loss due to the resistivity when electrons are collected. The material itself may preferably be composed of at least one element selected from copper, nickel, iron, titanium, tungsten, molybdenum, chromium, platinum, tin, aluminum, zinc, and cadmium.

Collector Having Micropores

The collector having micropores as used in the present invention can be produced by conducting an oxidation reaction and a reduction reaction. Processes as outlined below are utilized.

(1) A process in which a metal is subjected to oxidation treatment and thereafter to reduction treatment to obtain a metal member having micropores which is used as the collector of the present invention.

(2) A process in which a metal compound is subjected to reduction treatment to obtain the metal member having micropores.

Figure 4:
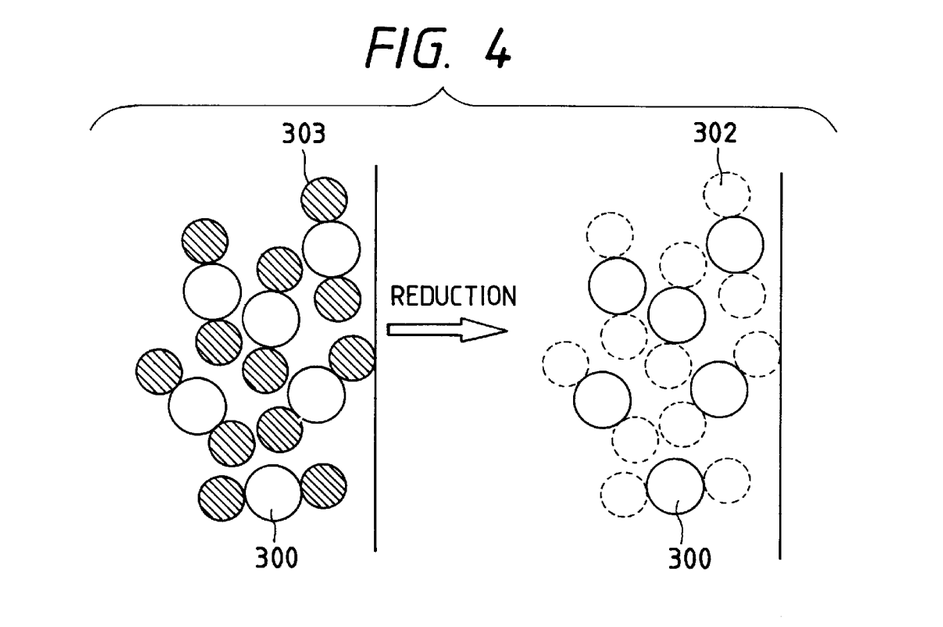
FIG. 4 is a diagrammatic view to illustrate an example of a structural change caused by reduction reaction taking place when a metal having micropores is produced.

The formation mechanism of the collector having micropores that constitutes the electrode of the present invention will be described below with reference to FIG. 4. A metal compound is heat-treated in a reducing atmosphere such as hydrogen and at a temperature not higher than the melting point of the metal, whereupon metal elements 300 are left and only elements 303 (e.g., oxygen atoms) constituting the compound are removed (here, removed in the form of, e.g., water vapor) and the part where the elements constituting the compound are removed forms micropores 302. Thus, the metal having a great number of micropores can be obtained.

The micropores may preferably have a size larger than the diameters of lithium or zinc atom of an active material. This makes it possible for the active material to be retained in the micropores, and hence the cell can be made to have a higher capacity.

Here, as a more specific example for producing the metal having a great number of micropores, such metal can be produced by oxidizing foil of metal such as nickel in a high-temperature furnace, followed by reduction treatment in an atmosphere of hydrogen. The results of X-ray diffraction of nickel foils actually produced by this method are shown in FIGS. 5A to 5C, and the results of SEM observation are shown in FIGS. 6A and 6B.

Figure 5A:
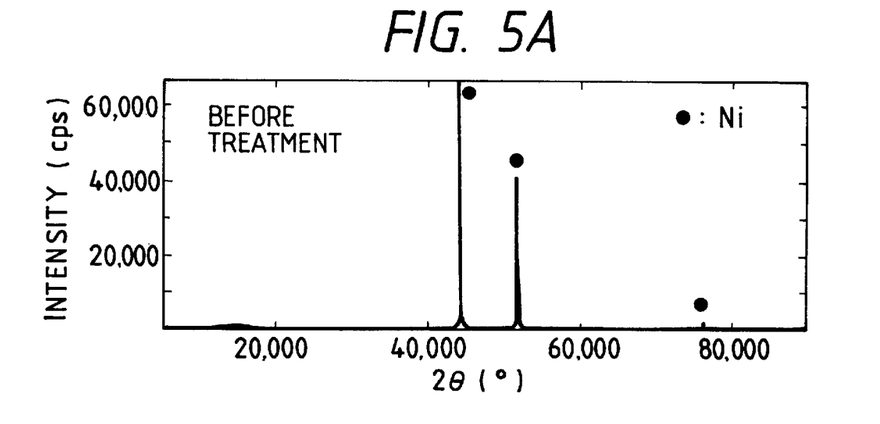
FIGS. 5A to 5C are graphs to show the results of X-ray diffraction.
Figure 5B:
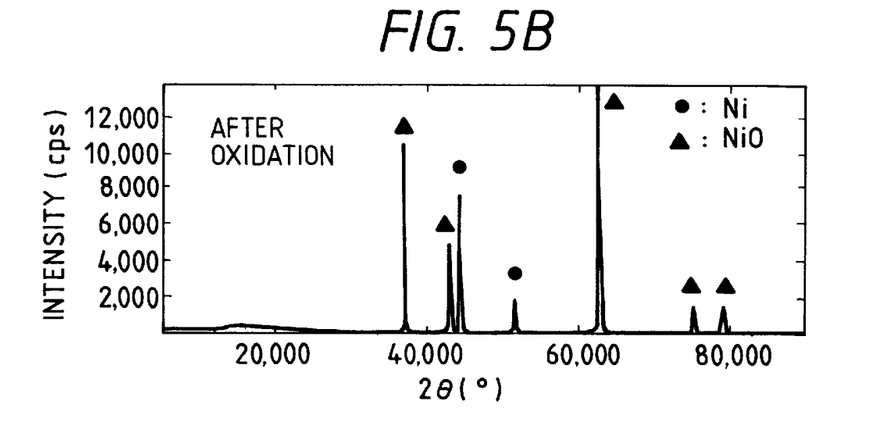
Figure 5C:
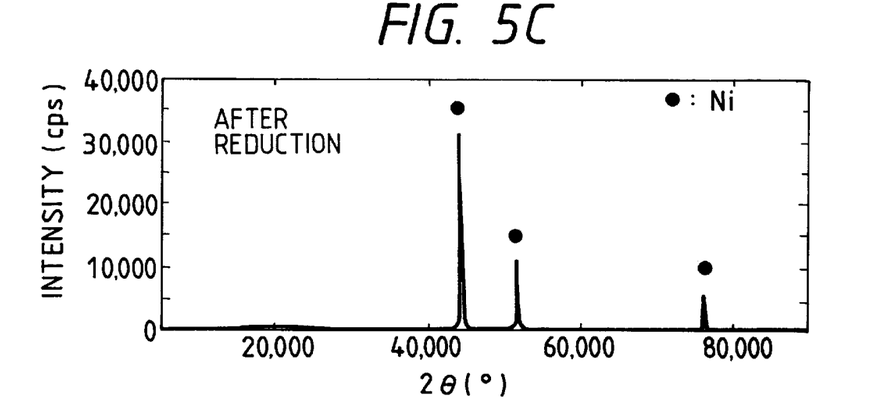

In FIGS. 5A to 5C, FIG. 5A shows the results of X-ray diffraction of nickel foil before its oxidation treatment; FIG. 5B, the results of X-ray diffraction of nickel foil after its oxidation treatment; and FIG. 5C, the results of X-ray diffraction after the nickel foil has been subjected to reduction treatment after its oxidation treatment. In FIGS. 5A to 5C, solid circles denote peaks assigned to nickel; and solid triangles, peaks assigned to nickel oxide (NiO).

As shown in FIGS. 5A to 5C, it is seen in the nickel foil that metallic nickel is converted into nickel oxide as a result of oxidation treatment, and it is thereafter returned to metallic nickel as a result of reduction treatment.

Figure 6A:
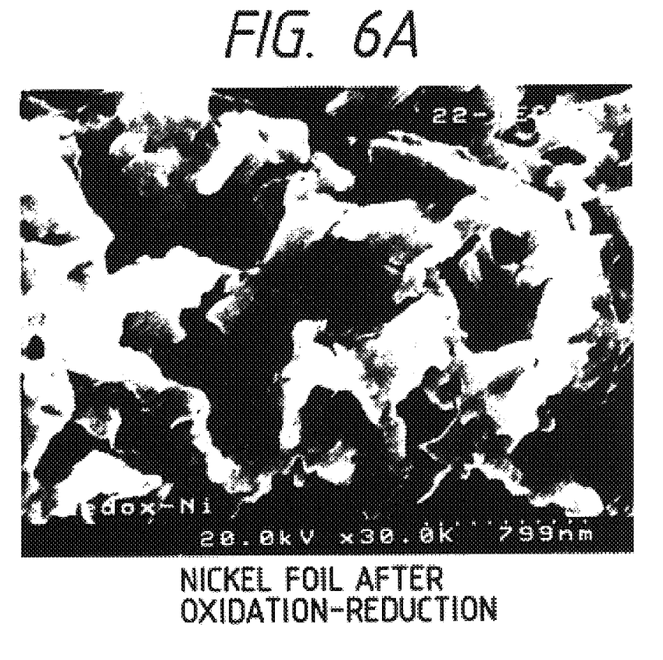
FIGS. 6A and 6B are SEM photographs showing the metal structure observed.
Figure 6B:
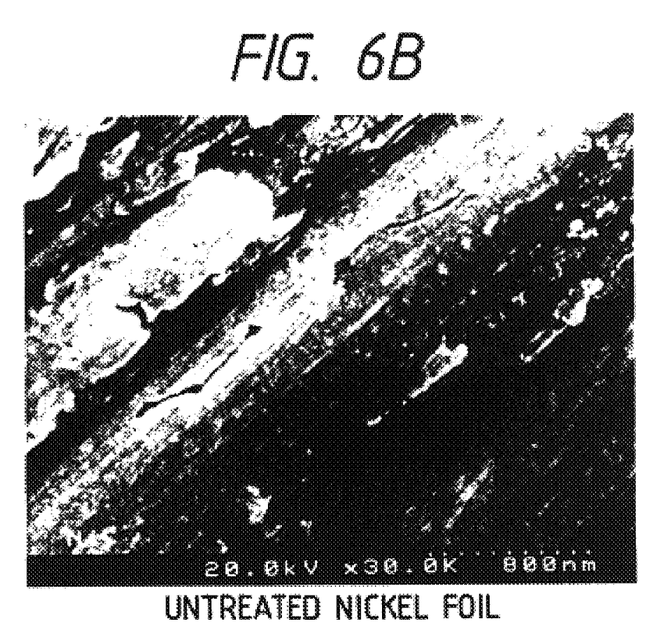

As the results of SEM observation, FIG. 6A shows the SEM photograph of the surface of nickel foil after its oxidation-reduction treatment; and FIG. 6B shows the SEM photograph of the surface of untreated nickel foil.

No micropores are seen in FIG. 6B. On the other hand, a great number of micropores with an average diameter not larger than 3 microns, as seen in FIG. 6A, micropores with an average diameter not larger than 1 micron, are formed in the nickel foil as a result of the oxidation-reduction treatment.

The electrode may have a specific surface area as large as possible. This is more preferable since the effective current density of the electrode can be decreased. More specifically, the dendrites growth of metals such as lithium and the like pertaining to the cell reaction can be controlled by decreasing the effective current density of the electrode, and consequently the cycle lifetime of the cell can be more improved. Stated specifically, the electrode may preferably have a specific surface area not smaller than 1 $m^2/g$, and more preferably not smaller than 10 $m^2/g$.

As an additional advantage, repeating the above oxidation-reduction treatment twice or more provides of an increase in pore density and pore volume. The micropores may preferably have a pore volume as large as possible. In the negative electrode, the pore volume may preferably be a volume large enough to receive all the negative electrode active material when charging is completed, and in the positive electrode may preferably be a volume large enough to receive all the positive electrode active material when discharging is completed. It may be optimized at a pore volume large enough to maintain the mechanical strength of the electrode.

Oxidation Method

The oxidation reaction for treating the metallic material to produce the collector having the above micropores is carried out by reacting at least one element selected from oxygen, nitrogen and halogen elements, whereby, for example, an oxide, nitride or halide of the metal can be formed.

As methods for the oxidation reaction, they may include a method in which a metal is placed in an atmosphere containing at least one gas selected from oxygen gas, air, water vapor, nitrogen gas and halogen gas, and is heat-treated at a temperature not higher than the melting point of the metal and not lower than 100° C. The oxidation may also be carried out by forming the gas into plasma, which is then brought into contact with the metal. As a means for the generation of plasma, at least one energy source selected from DC discharging, high-frequency charging, lasers, and ultraviolet irradiation may preferably be used. Plasma oxidation is advantageous in that the metal can be treated at a low temperature.

As other method for the oxidation reaction, it may include a method in which the metallic material is set as an anode and currents are passed across the anode and a counter electrode in an electrolytic solution to cause electrolytic oxidation reaction.

As will be seen from the foregoing description, the oxidation in the present invention refers to that in a broad sense (that is, to cause a metal to combine with an electrically negative element, i.e., to release electrons). More preferably, it is oxidation caused by oxygen.

Reduction Method

As methods for the oxidation reaction for producing the collector having the above micropores, they may include a method in which a metal oxide or metal compound (e.g., metal nitride or metal halide) is exposed to hydrogen formed into plasma, thereby causing reduction reaction, and a method in which the metal oxide or metal compound is heat-treated at 100° C. or above and also at temperatures not higher than the melting point of the metal contained in these compounds to be reduced, thereby causing reduction reaction. As a means for producing the plasma, at least one energy source selected from DC discharging, high-frequency charging, laser irradiation, and ultraviolet irradiation may preferably be used. Plasma reduction is advantageous in that the metal can be treated at a low temperature.

As other reduction method, it may include a method in which the metal oxide or metal compound is set as a cathode and currents are passed across the cathode and a counter electrode in an electrolytic solution to allow hydrogen ions to react with the cathode to thereby cause reduction reaction (an electrolytic reduction treatment). As the electrolytic solution, those capable of generating hydrogen by cathodic reaction and not causing deposition reaction of the metal may be employed. As a support electrolyte used in the electrolytic solution, it may preferably include sulfuric acid, hydrochloric acid, nitric acid, hydrofluoric acid, acetic acid, oxalic acid, aluminum chloride, magnesium chloride, sodium chloride, aluminum sulfide, magnesium sulfide, and sodium sulfide.

As another reduction method, a method may also be used in which the metal compound is heat-treated in the presence of a reducing agent to cause reduction. The reducing agent may include carbon, lithium, sodium, potassium, magnesium, calcium, barium, aluminum, zinc, and carbon monoxide, any of which may be used. When, for example, carbon is used to carry out reduction, a mixture of metal oxide and carbon is heat-treated in an atmosphere of carbon monoxide to produce carbon dioxide, which is then reduced into a metal. When alkali metals such as sodium, alkaline earth metals such as magnesium, or aluminum are used as the reducing agent, the reducing agent is mixed with a metal compound and thereafter the mixture is heat-treated in an atmosphere of inert gas such as helium gas, argon gas or nitrogen gas to reduce the metal compound to a metal.

In the present invention, the reduction refers to that in a broad sense (that is, to remove an electrically negative element from a metal, i.e., to accept electrons). More preferably, it is to allow an oxide to react with hydrogen to remove oxygen in the form of water.

As the metal compound to be reduced, halides, nitrides, hydroxides, carbonates, sulfates, nitrates, and organic acid salts are preferably used.

Negative Electrode and Positive Electrode for Lithium Secondary Cells

Negative Electrode for Lithium Secondary Cells

The negative electrode employing the collector of the present invention having micropores will be described with reference to FIG. 1. The negative electrode 102 of the present invention can be formed by superposing the negative electrode active material 101 on the collector 100 having micropores.

The negative electrode for lithium secondary cells, using carbon as the negative electrode active material retaining member (a negative electrode active material layer), can be produced, for example, in the following manner: First, a metal foil of copper, nickel or the like is heat-treated in the air. Next, the foil having been thus treated is heat-treated in an atmosphere of hydrogen so as to be reduced to thereby obtain a metal foil having micropores, which is used as the collector. Subsequently, a paste prepared by mixing a binder such as fluorine resin with carbon powder and adding a solvent to the mixture is coated on the collector, followed by drying.

Alternatively, a metal foil in which the micropores have been formed is used as the collector, and the collector is immersed in a solution containing an organic resin or cyclic hydrocarbon compound, followed by drying to incorporate the organic resin or cyclic hydrocarbon compound into the surface portion and micropores of the metal foil. Thereafter, the collector in or to which the organic resin or cyclic hydrocarbon compound has been incorporated or imparted is baked at a temperature within the temperature range of from 600° C. to 1,000° C. in an atmosphere of inert gas such as argon gas or nitrogen gas or in an atmosphere of inert gas to which hydrogen gas has been added. Thus, the collector with a carbon layer formed thereon can be prepared.

Organic Resins

The organic resin that can be used may include phenol resins, polyvinyl alcohol, polyvinyl acetate, polyacrylonitrile, polyparaphenylene, polyparaphenylene sulfide, polyparaphenylene vinylene, polythienylene, polydithienyl polyene, polyvinylnaphthalene, polyvinyl chloride, polyaniline, polypyrrole, furan resins, and silicone resins.

As the furan resins, homopolymer or copolymer of furfuryl alcohols or furfural alcohols may be used, and, stated specifically, furfural resin, furfural phenol resin, furfural ketone resin, furfuryl alcohol resin, and furfuryl alcohol phenol resin may be used.

Cyclic Hydrocarbons

The cyclic hydrocarbon may preferably be those in which the number of carbon, nitrogen and sulfur atoms is at least 8 in total. Stated specifically, naphthalene, 2,2'-binaphthyl, biphenylene, acenaphtylene, acenaphthene, phenanthrene, anthracene, fluoranethene, aceanthrene, triphenylene, pyrene, chrysene, naphthacene, picene, perylene, benzo[a]pyrene, rubicene, coronene, ovalene, quinoline, isoquinoline, 4H-quinolidine, cinnoline, quinazoline, quinoxaline, phthaladine, dibenzothiopyrane, acrydine, dianthrene, phenazine, phenothiazine, phenanthridine, 1,10-phenantholine, benzo[c]cinnoline and so forth may be used.

Instead of the formation of the negative electrode active material composed of the carbon material, the metal foil having micropores may be solely used as the negative electrode so that lithium is deposited in the micropores by charging reaction to form the negative electrode active material layer.

Positive Electrode for Lithium Secondary Cells

The positive electrode for lithium secondary cells, employing the collector having micropores of the present invention will be described with reference to FIG. 1. The positive electrode 102 can be formed by superposing the positive electrode active material 101 on the collector 100 having micropores.

To form the positive electrode active material layer 101, a paste prepared by mixing a binder and a conductive aid in a positive electrode active material powder and adding a solvent to the mixture may be coated on the collector 100, followed by drying. The conductive aid that can be used in the positive electrode may include powdery or fibrous aluminum, copper, nickel, stainless steel, graphite powder, carbon powder such as Ketchen black and acetylene black and carbon fiber.

As the binder, those stable to the electrolytic solution is preferred, including, for example, fluorine resins or polyolefines such as polytetrafluoroethylene, polyvinylidene fluoride, polyethylene, polypropylene, an ethylene-propylene copolymer and an ethylene-propylene-diene terpolymer.

Positive Electrode Active Materials

The positive electrode active material may be made of a transition metal oxide, a transition metal sulfide, a lithium-transition metal oxide or a lithium-transition metal sulfide, which is generally used. The transition metals of the transition metal oxide and transition metal sulfide may include, for example, Sc, Y, lanthanide, actinide, Ti, Zr, Hf, V, Nb, Ta, Cr, Mo, W, Mn, Tc, Re, Fe, Ru, Os, Co, Rh, Ir, Ni, Pd, Pt, Cu, Ag, Au and so forth, which are elements partially having a d-shell or f-shell. In particular, the first transition series metals, Ti, V, Cr, Mn, Fe, Co, Ni and Cu are preferably used.

The lithium-transition metal oxide or lithium-transition metal sulfide can be prepared by allowing a transition metal compound to react with a lithium compound.

Alternatively, the positive electrode may be obtained by immersing the metal having micropores in a solution of a mixture of a lithium salt and a transition metal salt, followed by baking so that the micropore surfaces of the collector metal are coated with a lithium-transition metal compound or the micropores of the collector metal is filled with it. This can simplify the production steps.

As the lithium salt, lithium hydroxide, lithium carbonate, lithium acetate or the like may be used. As the transition metal salt, those in the form of nitrates, sulfates, halides, oxalates, acetates or the like may be used.

The heat treatment is made at a temperature not higher than the melting point of the metal having micropores, in order to prevent the metal from melting to cause a decrease in micropores at temperatures higher than the melting point.

The micropores of the collector metal are filled with the host material of a positive electrode active material capable of intercalating and releasing the guest lithium ions, or the micropore surfaces of the collector metal are coated with the host material. Since the positive electrode active material is present in the micropores of the collector metal or on the micropore surfaces thereof, the electron collecting performance can be improved. Since the positive electrode active material present in the micropores or on the micropore surfaces of the collector metal having a large specific surface area can decrease the effective current density when cells are charged and discharged, any secondary reaction can be prohibited to facilitate the reversible intercalation and release of lithium ions inside the positive electrode active material.

In addition, since a good adhesion has been attained between the positive electrode active material and the collector metal, the electrode can have a higher strength than that formed of a flat collector member on which a lithium-transition metal compound is superposed. Hence, the charging and discharging can be rapidly performed at higher currents, and also secondary cells having a longer cycle lifetime can be obtained.

The collector having micropores, used in the electrode for secondary cells of the present invention may be used in either the positive electrode or the negative electrode, or may be used in both the positive electrode and the negative electrode. This is effective for improving the performance of secondary cells. When the collector having micropores is used only in either the positive electrode or the negative electrode, a metallic material having no micropores may be used as the collector in the other electrode where it is not used. In other electrode, the collector may be in the form of a plate, foil, mesh, sponge, fiber, punching metal, expanded metal or the like, any of which may be used.

The collector may preferably be made of a material selected from the group consisting of nickel, cobalt, titanium, aluminum, copper, silver, gold, tungsten, molybdenum, iron, platinum, chromium and the like, and being insoluble in the electrolytic solution at the charging and discharging of cells.

Treatment to More Increase the Specific Surface Area and Pore Volume of the Metal Used in the Collector of the Electrode of the Present Invention Methods for increasing the specific surface area and pore volume of the metal used in the collector of the electrode of the present invention may include, for example, the following two types.

a) Oxidation-reduction treatment carried out plural times; and b) Etching treatment of the metal before its oxidation-reduction treatment.

a) Oxidation-reduction Treatment Carried Out Plural Times

The metal having been subjected to oxidation-reduction treatment to increase the specific surface area and pore volume is further subjected to the treatment repeated at least once (i.e., subjected to the oxidation-reduction treatment twice or more), whereby its specific surface area and pore volume can be further increased.

b) Etching Treatment of the Metal Before Its Oxidation-reduction Treatment

A metal foil, a metal powder or a sintered metal is pretreated by etching before it is subjected to oxidation-reduction treatment, whereby the specific surface area of the electrode can be further enlarged.

As methods for the etching, methods such as chemical etching, electrochemical etching and plasma etching may be employed.

The chemical etching is a process in which the metal is reacted with acid or alkali to carry out etching. Examples thereof are as follows.

As etchants for a metal powder of aluminum, zinc, lead, tin or the like, phosphoric acid, sulfuric acid, hydrochloric acid, nitric acid, acetic acid, hydrofluoric acid, potassium hydroxide, sodium hydroxide, lithium hydroxide, and a mixture thereof may be used.

As etchants in the case of nickel, dilute acid of nitric acid or the like may be used. In the case of tin, organic acids such as sulfuric acid, hydrochloric acid, nitric acid and acetic acid, cupric chloride solution, ferric chloride solution, ammonia water and so forth may be used. In the case of titanium, hydrofluoric acid, phosphoric acid and so forth may be used.

The electrochemical etching is a process in which an electric field is formed across the opposing electrode in an electrolytic solution so as to be electrochemically dissolved away in the form of metal ions. As electrolytic solutions for aluminum or the like, phosphoric acid, sulfuric acid, chromic acid, and a mixture thereof may be used.

The plasma etching is a process in which an etching gas is formed into plasma and reactive ions or radicals are reacted to carry out etching. As the starting material etching gas, tetrachloromethane, tetrafluoromethane, chlorine, trichloromonofluoromethane, dichlorodifluormethane, chlorotrifluoromethane and so forth may be used.

Electrodes for Alkaline Secondary Cells

Secondary cells making use of an alkali in electrolyte may include nickel-zinc cells, air-zinc cells, nickel-cadmium cells, and nickel-hydrogen occluded alloy cells.

In the cases of nickel-zinc cells and air-zinc cells, zinc is used in the negative electrode active material layer. In the case of nickel-cadmium cells, cadmium is used in the negative electrode active material layer. In the case of nickel-hydrogen occluded alloy cells, a nickel-hydrogen occluded alloy is used in the negative electrode active material layer. In the cases of nickel-zinc cells, nickel-cadmium cells and nickel-hydrogen occluded alloy cells, nickel hydroxide is used in the positive electrode active material layer. In the case of air-zinc cells, oxygen in the air is used as the positive electrode active material, and the positive electrode active material layer is formed of a catalyst such as porous carbon, cupric oxide or nickel oxide and a water-repellant material such as fluorine resin.

The negative electrode and positive electrode of any of the foregoing can be formed in the same manner as the electrodes for lithium secondary cells previously described.

Taking note of a zinc negative electrode employing zinc as the negative electrode active material and a nickel positive electrode employing nickel hydroxide as the positive electrode active material, the electrodes will be described below in greater detail.

Nickel Hydroxide Positive Electrode for Alkaline Secondary Cells

The collector formed of a metal having a great number of micropores is filled or superposed therein with nickel hydroxide, whereby the active material can be filled in a larger quantity while maintaining electrode strength, compared with a system in which sintered metals are filled with active materials. Also, the specific surface area of the collector can be made larger than that in the sintering system and the effective current density of the electrode can be decreased. Hence, the electrode active material can be prevented from undergoing abrupt crystal changes when cells are charged and discharged, and the cycle lifetime of the cells can be improved. Moreover, the electrode can be made to have a smaller thickness than ever, and hence the area of the electrode can be made larger, making it possible to improve high-rate charging and discharging performance and to increase the cell capacity. When the collector is desired to be filled therein with the active material in a larger quantity, it is effective to repeat the oxidation-reduction treatment of the metal having micropores to thereby increase the porosity.

Methods of Filling with Nickel Hydroxide

Methods by which the collector formed of the metal having micropores is filled therein with nickel hydroxide may include the following two methods. That is;

1) a chemical impregnation method in which the collector formed of the metal having a great number of micropores is immersed in a solution of a nickel compound salt, which is then precipitated with an alkali so as to be filled with the active material; and 2) a method in which the collector formed of the metal having a great number of micropores is immersed in a solution of a nickel compound salt, which is then converted into nickel hydroxide in heated water vapor so as to be filled with the active material.

As the nickel compound salt, those in the form of nitrates, sulfates, chlorides or the like may be used. In order to improve charge performance or to improve charge-discharge efficiency, it is preferable to add an element such as cobalt, cadmium or zinc.

Separator

The separator plays a role of preventing the short between the negative electrode and the positive electrode. It also plays a role of holding the electrolytic solution in some cases. It is required for the separator to have pores through which ions pertaining to the cell reaction can move and to be insoluble in and stable to the electrolytic solution, and hence nonwoven fabrics made of glass, polyolefins such as polypropylene or polyethylene, fluorine resin, polyamide or the like or materials having a microporous structure are used. When the electrolytic solution is aqueous, it is preferable to use materials subjected to hydrophobic treatment. It is also possible to use metal oxide films having micropores, or metal oxide-resin composite films. Especially when metal oxide films having a multi-layer structure are used, dendrites may penetrate with difficulty and the short can be effectively prevented. The safety can be further improved when fluorine resin films or glass or metal oxide films are used, the former being flame-retardant materials, and the latter, uninflammable materials.

Electrolyte (1) In the Case of Lithium Secondary Cells

An electrolytes may be used as it is. Alternatively, it may be dissolved in a solvent so as to be used in the form of a solution, or a gelling agent such as a polymer may be added to the solution so as to be used in the form of a solid. It is commonly used in such a manner that an electrolytic solution prepared by dissolving an electrolyte in a solvent is held by a porous separator. The higher conductivity the electrolyte has, the more preferable. At least, it may preferably have a conductivity at 25° C., of $1 \times 10^{-3}$ S/cm or more, and more preferably $5 \times 10^{-3}$ S/cm or more.

As the electrolyte, acids such as $H_2SO_4$, HCl and $HNO_3$, salts comprised of lithium ions ($Li^+$) and Lewis acid ions [$BF_4^-$, $PF_6^-$, $ClO_4^-$, $CF_3SO_3^-$, $BPh_4^-$ (Ph: phenyl group)], and mixed salts of these may be used. Besides these support electrolytes, it is also possible to use salts of cations such as sodium ions, potassium ions or tetraalkylammonium ions with Lewis acid ions. These salts may preferably be previously subjected to thorough dehydration and deoxidation by, e.g., heating under reduced pressure.

As the solvent of the electrolyte, it is possible to use acetonitrile, benzonitrile, propylene carbonate, ethylene carbonate, dimethyl carbonate, diethyl carbonate, dimethyl formamide, tetrahydrofuran, nitrobenzene, dichloroethane, diethoxyethane, 1,2-dimethoxyethane, chlorobenzene, γ-butyrolactone, dioxorane, sulforane, nitromethane, dimethyl sulfide, dimethyl sulfoxide, methyl formate, 3-methyl-2-oxazolidinone, 2-methyltetrahydrofuran, 3-propylsydnone, sulfur dioxide, phosphoryl chloride, thionyl chloride, sulfuryl chloride, and a mixture thereof.

The above solvent may preferably be dehydrated with activated alumina, molecular sieves, phosphorus pentaoxide, calcium chloride or the like. Some solvents may preferably be distilled in the presence of an alkali metal in an inert gas to effect both removal of impurities and dehydration.

In order to prevent the electrolytic solution from leaking, it may preferably be gelled. As gelling agents, polymers capable of absorbing the solvent of the electrolytic solution to swell may preferably be used, and polymers such as polyethylene oxide, polyvinyl alcohol and polyacrylamide may be used.

(2) In the Case When the Negative Electrode Active Material is Zinc or the Positive Electrode Active Material is Nickel Hydroxide (Alkaline Secondary Cells)

Aa electrolytes, alkalis such as potassium hydroxide, sodium hydroxide and lithium hydroxide and salts such as zinc bromides may be used.

In order to prevent the electrolytic solution from leaking, it may preferably be gelled. As gelling agents, polymers capable of absorbing the solvent of the electrolytic solution to swell may preferably be used, and polymers such as polyethylene oxide, polyvinyl alcohol and polyacrylamide and starch may be used.

Shape and Structure of Cells

As the shape of actual cells, the cell may be of a flat type, a cylindrical type, a rectangular type or a sheet type. In the case of a cylindrical type with a spiral structure, the separator is held between the negative electrode and the positive electrode and these are rolled up, whereby the electrode area can be made larger and great currents can be passed when cells are charged and discharged.

In the case of the rectangular type, the holding space of machinery in which secondary cells are to be held can be effectively utilized. As its structure, it may have the structure of a single layer or a multiple layer.

Figure 7:
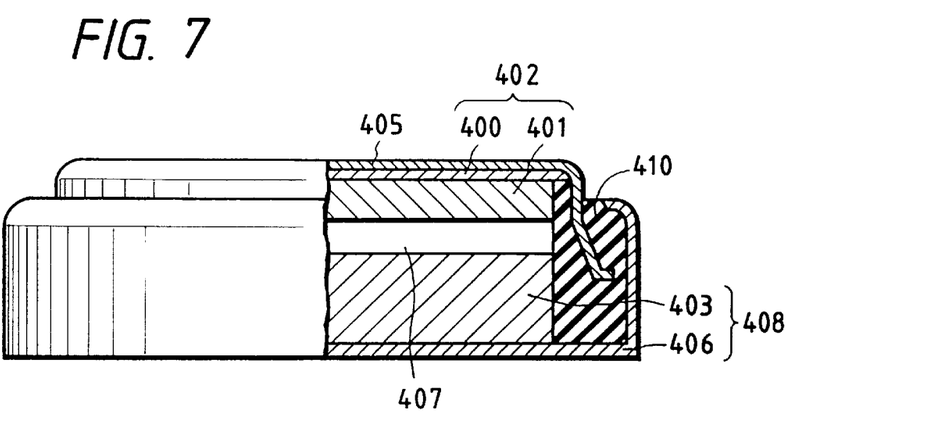
FIG. 7 is a diagrammatic cross section to schematically illustrate an example of a single-layer type flat cell.
Figure 8:
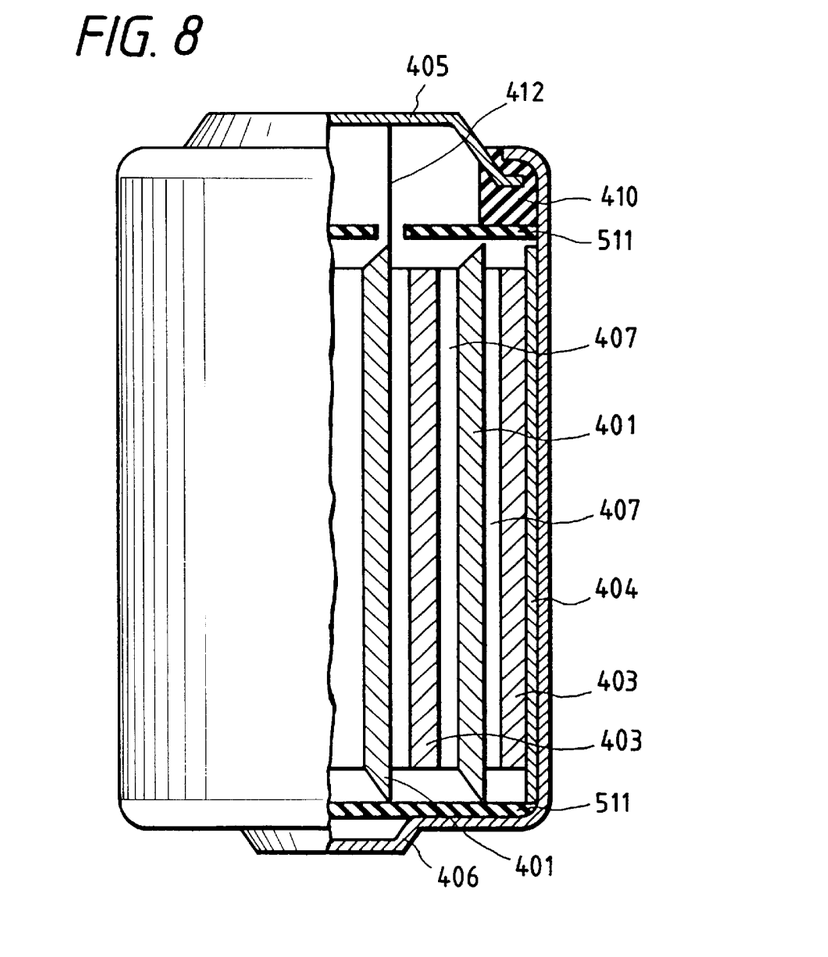
FIG. 8 is a diagrammatic cross section to schematically illustrate an example of a cylinder type cell having a spiral structure.

FIGS. 7 and 8 schematically show cross sections of examples of a single-layer type flat cell and a spiral structure cylindrical cell, respectively. In FIGS. 7 and 8, reference numeral 400 denotes a negative electrode collector; 401, a negative electrode active material; 402, the negative electrode; 403, a positive electrode active material; 404, a positive electrode conductor; 405, a negative electrode terminal (a negative electrode cap); 406, a positive electrode can; 407, an electrolyte and a separator; 408, the positive electrode; 410, an insulating packing; 412, a negative electrode conductor; and 511, an insulating plate. In FIG. 8, the part shown as the active material may contain the collector.

As an example of the assemblage of the cells shown in FIGS. 7 and 8, the negative electrode active material 401 and a molded positive electrode active material 403 are incorporated in the positive electrode can 406, interposing the separator 407 between them. After an electrolyte has been injected, the negative electrode cap 405 and the insulating packing 410 are put together and caulked to make up the cell.

The preparation of the materials for the lithium secondary cells and the assemblage of the cells may preferably be carried out in dry air from which the moisture has been thoroughly removed, or in dry inert gas.

Insulating Packing

As materials for the insulating packing 410, fluorine resins, polyamide resins, polysulfone resins, and various types of rubbers may be used. As methods of sealing the opening, the cap and packing may be caulked as shown in FIGS. 7 and 8 using a gasket of the insulating packing, and besides, methods such as glass sealing, adhesive bonding, welding and soldering may be used.

As materials for the insulating plate as shown in FIG. 8, various types of organic resin materials and ceramics may be used.

External Can

As materials for the positive electrode can 406 and negative electrode cap 405 of actual cells, stainless steel, in particular, titanium-clad stainless steel or copper-clad stainless steel, and nickel-coated steel sheet may be used.

In those shown in FIGS. 7 and 8, the positive electrode can 406 serves also as a cell case. As materials for the cell case, not only stainless steel but also metals such as zinc, plastics such as polypropylene, or composite materials of metals or glass fibers with plastics may be used.

Safety Valve

Not shown in FIGS. 7 and 8, it is common to provide a safety valve such as rubber, a spring, a metal ball or an explosion disk (a blind gasket) as a safety measure taken when the internal pressure of cell increases.

The present invention will be described below in greater detail by giving Examples. The present invention is by no means limited by these Examples.

Negative Electrode of Lithium Secondary Cells

Examples are shown below in which the metal having a great number of micropores, used for the collector of the present invention, is applied in the negative electrode for the lithium secondary cells. In the following Examples, for the purpose of comparing performances later, the positive electrodes were produced under the same conditions including their size.

EXAMPLE 1

A lithium secondary cell having cross-sectional structure as schematically shown in FIG. 8 was produced. First, nickel foil of 50 μm thick was immersed in 0.5N nitric acid to carry out etching, followed by drying. Next, the nickel foil thus treated was left to stand still in a muffle furnace set to 1,000° C. in the atmosphere to effect oxidation. The oxidized foil was moved to an electric furnace in which hydrogen gas was flowed, and heat-treated at 400° C. until it was reduced to a metal, which was used as the negative electrode as it was.

Here, using an X-ray diffraction apparatus (RINT 2000, trade name; manufactured by Rigaku Co.), the cross sections of the nickel before and after the reduction treatment were analyzed. As a result, it was found that through the reduction treatment the nickel oxide was reduced to metallic nickel (FIGS. 5A to 5C).

As the results of observation using SEM (scanning electron microscope), SEM photographs are shown in FIGS. 6A and 6B. It was also found that, as a result of the oxidation-reduction treatment, micropores of 1 micron or less were formed from the surface toward the inside.

The specific surface area was also measured by the BET (Brunauer-Emmett-Teller) method to find that the electrode had a specific surface area of 4 m$^2$/g.

As the positive electrode active material, electrolytic manganese dioxide and lithium carbonate were mixed in a molar ratio of Mn:Li=1:0.4, followed by heating at 800° C. to prepare lithium-manganese oxide. In the lithium-manganese oxide thus prepared, 3% by weight of carbon powder of acetylene black and 5% by weight of polyvinylidene fluoride powder were mixed, followed by addition of N-methylpyrrolidone to make them into a paste. Thereafter, the paste was coated on aluminum foil, followed by drying to form a positive electrode.

As the electrolytic solution, a solution prepared by dissolving 1 M (mol/lit) of lithium tetrafluoroborate in an equal-weight mixed solvent of ethylene carbonate (EC) and dimethyl carbonate (DMC) whose water content had been thoroughly removed was used.

As the separator, a 25 μm thick microporous separator made of polypropylene was used.

The cell was assembled in an atmosphere of dry argon gas, where the negative electrode and the positive electrode between which the separator was held were inserted to a positive electrode can made of titanium-clad stainless steel, and the electrolytic solution was injected into it. Thereafter, the top opening was hermetically closed with a negative electrode cap made of titanium-clad stainless steel and insulating packing made of a fluorine rubber. Thus, the lithium secondary cell was produced.

EXAMPLE 2

A lithium secondary cell having cross-sectional structure as schematically shown in FIG. 8 was produced. Nickel foil to which the same oxidation-reduction treatment as that carried out in Example 1 was repeated three times was used as the negative electrode.

Here, its specific surface area was measured to find that the electrode had a specific surface area of 20 m$^2$/g.

Subsequently, the same procedure as in Example 1 was repeated to assemble the cell as shown in FIG. 8.

EXAMPLE 3

A lithium secondary cell having cross-sectional structure as schematically shown in FIG. 8 was produced. The same nickel foil as used in Example 1 was placed in a vacuum chamber and heated to 200° C. Thereafter, nitrogen gas was introduced, microwave energy was fed to cause discharge to thereby produce nitrogen plasma, and nitrogen treatment was applied to obtain nickel nitride. Subsequently, hydrogen gas was passed in the vacuum chamber, and microwave energy was fed to cause discharge to thereby make nitrogen plasma treatment to obtain a nickel foil having micropores. This foil was used as the negative electrode.

Here, analysis was made in the same manner as in Example 1, using the X-ray diffraction apparatus. As a result, it was found that through the reduction treatment the nickel oxide was reduced to metallic nickel.

Its specific surface area was also measured to find that the electrode had a specific surface area of 3 m$^2$/g.

Subsequently, the same procedure as in Example 1 was repeated to assemble the cell as shown in FIG. 8.

EXAMPLE 4

A lithium secondary cell having cross-sectional structure as schematically shown in FIG. 8 was produced. The surface of the same porous nickel foil as produced in Example 2 was etched with an aqueous nitric acid solution. The foil thus treated was immersed in a tetrahydrofuran solution of polyfurfuryl alcohol, followed by drying, the immersion and drying being repeated, and thereafter the foil thus treated was baked at 700° C. in an electric furnace having an atmosphere of nitrogen, to obtain a negative electrode comprising a nickel foil collector having micropores and a carbon layer formed on its surface.

Subsequently, the same procedure as in Example 1 was repeated to assemble the cell as shown in FIG. 8.

EXAMPLE 5

A lithium secondary cell having cross-sectional structure as schematically shown in FIG. 8 was produced. First, copper foil of 50 μm thick was immersed in 0.5N nitric acid to carry out etching, followed by drying. Next, the copper foil thus treated was left to stand still in a muffle furnace set to 600° C. in the atmosphere to effect oxidation. The oxidized foil was moved to an electric furnace in which hydrogen gas was flowed, and heat-treated at 400° C. until it was reduced to metal. This oxidation-reduction treatment was repeated three times to obtain metallic copper foil having a great number of micropores. This metallic copper foil having a great number of micropores was immersed in a solution prepared by dissolving anthracene in benzene, followed by drying, and the foil thus treated was baked at 600° C. in an electric furnace having an atmosphere of argon gas, to obtain a negative electrode comprising a copper foil collector having micropores and a carbon layer formed on its surface.

Subsequently, the same procedure as in Example 1 was repeated to assemble the cell as shown in FIG. 8.

EXAMPLE 6

A lithium secondary cell having cross-sectional structure as schematically shown in FIG. 8 was produced. The cell was assembled in the same manner as in Example 5 except that the oxidized copper foil was set as the cathode and electrolytically reduced in an aqueous sulfuric acid solution to obtain a metallic copper foil having micropores.

Here, analysis was made in the same manner as in Example 1, using the X-ray diffraction device. As a result, it was found that through the reduction treatment the copper oxide was reduced to metallic copper.

Its specific surface area was also measured to find that the electrode had a specific surface area of 30 m$^2$/g.

EXAMPLE 7

A lithium secondary cell having cross-sectional structure as schematically shown in FIG. 8 was produced. On the same copper foil having micropores as obtained in Example 6, a paste prepared by mixing 5% by weight of polyvinylidene fluoride powder with natural graphite treated at 2,000° C. in an argon stream, followed by addition of N-methylpyrrolidone, was coated, followed by drying to form a negative electrode.

Subsequently, the same procedure as in Example 1 was repeated to assemble the cell as shown in FIG. 8.

EXAMPLE 8

A lithium secondary cell having cross-sectional structure as schematically shown in FIG. 8 was produced. First, aluminum foil of 50 μm thick was set as the anode and electrolytically etched in an aqueous hydrochloric solution, followed by drying. Next, the aluminum foil thus treated was left to stand still in an electric furnace set to 150° C. in an atmosphere of ozone to effect oxidation. The oxidized foil was introduced into a vacuum chamber and hydrogen gas was flowed to cause high-frequency discharge, and plasma treatment was applied at 400° C. to make reduction treatment. The foil thus reduced was used as the negative electrode.

Here, analysis was made in the same manner as in Example 1, using the X-ray diffraction device. As a result, it was found that through the reduction treatment the aluminum oxide was reduced to metallic aluminum.

Its specific surface area was also measured to find that the electrode had a specific surface area of 10 m$^2$/g.

Subsequently, the same procedure as in Example 1 was repeated to assemble the cell as shown in FIG. 8.

EXAMPLE 9

A lithium secondary cell having cross-sectional structure as schematically shown in FIG. 8 was produced. On the same nickel foil having micropores as produced in Example 1, a mixture prepared by adding azobisisobutyronitrile to an acetonitrile solution of polyethylene oxide was spin-coated, and thereafter the foil thus treated was heat-treated at 150° C. under reduced pressure, followed by ultraviolet irradiation to form a negative electrode.

Subsequently, the same procedure as in Example 1 was repeated to assemble the cell as shown in FIG. 8.

As the positive electrode active material in Examples 1 to 9, only one kind of lithium-manganese oxide was used so that the performance of the negative electrode can be evaluated, and the material is by no means limited thereto. Various types of positive electrode active materials such as lithium-nickel oxide and lithium-cobalt oxide may also be used.

With regard to the electrolytic solution also, only one kind of electrolytic solution was used in Examples 1 to 9, but the present invention is by no means limited to such an example.

Positive Electrode of Lithium Secondary Cells

EXAMPLE 10

A lithium secondary cell having cross-sectional structure as schematically shown in FIG. 8 was produced. First, nickel foil of 100 μm thick was immersed in 0.5N nitric acid to carry out etching, followed by drying. Next, the nickel foil thus treated was left to stand still in a muffle furnace set to 1,000° C. in the atmosphere to effect oxidation. The oxidized foil was moved to an electric furnace in which hydrogen gas was flowed, and heat-treated at 400° C. until it was reduced to metallic nickel. This oxidation-reduction treatment was repeated five times, and thereafter a nickel foil having a great number of micropores was obtained.

This nickel foil having a great number of micropores was immersed in a solution prepared by mixing manganese acetate and lithium acetate in a molar ratio of Mn:Li=1:0.4 and thereafter dissolving the mixture in water, followed by drying. The immersion and drying were repeated.

Next, the foil thus treated was heat-treated in an electric furnace controlled at 400° C., to provide in the micropores and on its surface of the metallic nickel foil, lithium-manganese oxide formed from manganese acetate and lithium acetate. The obtained electrode was used as the positive electrode. The same procedure as in Example 7 except for using this positive electrode was repeated to assemble the cell as shown in FIG. 8.

EXAMPLE 11

A positive electrode was produced in the same manner as in Example 1 except that the copper foil having a great number of micropores, prepared in the same manner as in Example 10, was used as the collector and a positive electrode active material as formed thereon. The same procedure as in Example 10 except for using it was repeated to assemble the cell as shown in FIG. 8.

EXAMPLE 12

A nickel-zinc secondary cell having cross-sectional structure as schematically shown in FIG. 8 was produced. First, copper foil of 100 μm thick was left to stand still in an electric furnace set to 700° C. in an atmosphere of oxygen to effect oxidation. This oxidized foil was moved to an electric furnace in which hydrogen gas was flowed, and heat-treated at 400° C. until it was reduced to metallic copper. On the resulting copper foil having micropores, zinc was deposited by electrolytic plating. The resulting foil was used as the negative electrode.

As the positive electrode active material, nickel hydroxide and metallic cobalt were mixed in a proportion of 1:0.1, thereafter 5% by weight of methyl cellulose was mixed, and water was added to prepare a pasty mixture, which was then coated on a nickel foil, followed by drying to form the positive electrode.

As the separator, a 200 μm thick nonwoven fabric made of polypropylene, having been subjected to hydrophobic treatment, was used. As the electrolytic solution, an aqueous solution of 30% by weight of potassium hydroxide was used.

To assemble the cell, the negative electrode and the positive electrode between which the separator was held were inserted to a positive electrode can made of titanium-clad stainless steel, and the electrolytic solution was injected into it. Thereafter, the top opening was hermetically closed with a negative electrode cap made of titanium-clad stainless steel and a insulating packing of fluorine rubber. Thus, the nickel-zinc secondary cell was produced.

EXAMPLE 13

A nickel-cadmium secondary cell having cross-sectional structure as schematically shown in FIG. 8 was produced. Nickel foil of 200 μm thick was subjected to oxidation-reduction treatment under the same conditions as in Example 1. This procedure was repeated five times and the foil thus treated was used. This nickel foil was immersed in an aqueous solution in which nickel nitrate and cobalt nitrate were mixed in a proportion of 1:0.1, and thereafter converted into nickel hydroxide in an aqueous solution of 20% by weight of sodium hydroxide. This procedure was repeated five times and the foil thus treated was used as the positive electrode.

As the negative electrode active material, cadmium oxide and metallic cadmium were mixed in a proportion of 1:0.2, 5% by weight of methyl cellulose was further mixed, and water was added to prepare a pasty mixture, which was then coated on nickel foil to form the negative electrode.

The same procedure as in Example 12 except for using the above positive electrode and negative electrode was repeated to assemble the cell as shown in FIG. 8.

Comparative Example 1

A cell having cross-sectional structure as schematically shown in FIG. 8 was produced in the same manner as in Example 1 except that the negative electrode of Example 1 was replaced with the negative electrode using untreated nickel foil.

Comparative Example 2

A cell having cross-sectional structure as schematically shown in FIG. 8 was produced in the same manner as in Example 1 except that the negative electrode of Example 1 was replaced with the negative electrode using untreated aluminum foil.

Comparative Example 3

A cell having cross-sectional structure as schematically shown in FIG. 8 was produced in the same manner as in Example 1 except that the negative electrode of Example 1 was replaced with a graphite negative electrode prepared in the following manner. To produce the graphite negative electrode, natural graphite powder was heat-treated at 2,000° C. in an atmosphere of argon gas, and thereafter 3% by weight of acetylene black and 5% by weight of polyvinylidene fluoride powder were mixed in the natural graphite powder thus treated, and N-methylpyrrolidone was added to prepare a pasty mixture, which was then coated on 35 $\mu$m thick copper foil, followed by drying.

Subsequently, the same procedure as in Example 1 was repeated to assemble the cell having cross-sectional structure as schematically shown in FIG. 8.

Comparative Example 4

A lithium secondary cell having cross-sectional structure as schematically shown in FIG. 8 was produced. Polyfurfuryl alcohol was baked at 700° C. in an electric furnace having an atmosphere of nitrogen gas, followed by pulverization to obtain carbon powder. In this carbon powder, 3% by weight of acetylene black and 5% by weight of polyvinylidene fluoride powder were mixed, and N-methylpyrrolidone was added to prepare a pasty mixture, which was then coated on 35 $\mu$m thick copper foil, followed by drying. The foil thus obtained was used as the negative electrode. Subsequently, like Examples, the same procedure as in Example 1 was repeated to produce the cell having cross-sectional structure as schematically shown in FIG. 8.

Comparative Example 5

A sintering type zinc negative electrode produced in the following manner was used in place of the negative electrode of Example 12.

A paste obtained by kneading zinc powder with 5% by weight of methyl cellulose was coated on punching metal copper foil, followed by drying to form a zinc negative electrode. The same procedure as in Example 12 except for using this zinc negative electrode was repeated to produce the cell having cross-sectional structure as schematically shown in FIG. 8.

Comparative Example 6

A sintering type nickel foil produced in the following manner was used as the positive electrode collector in place of the nickel foil of the positive electrode collector of Example 13.

A paste obtained by kneading nickel powder (#255, available from Inco Co.) with 5% by weight of methyl cellulose was coated on nickel foil, followed by drying and thereafter sintering at 900° C. The obtained electrode had a thickness of 100 $\mu$m The same procedure as in Example 13 except for using this sintered nickel electrode was repeated to produce the cell having cross-sectional structure as schematically shown in FIG. 8.

Performance Evaluation on Secondary Cells

The performances of the secondary cells produced in Examples and Comparative Examples were tested on charging and discharging cycles under conditions shown below to evaluate the performances of the secondary cells of Examples in comparison with those of Comparative Examples.

The charging and discharging cycles were tested under conditions of charging and discharging at 0.5 C (a current 0.5 time the value of capacity/time) on the basis of the electric capacity calculated from the mass of the positive electrode active material, and at intervals of 30 minutes. As a charging and discharging device, HJ-106M, manufactured by Hokuto Denko K.K., was used. In the charging and discharging tests, the charging was first tested, the discharge quantity on the third-time discharging was regarded as cell capacity, and the cycle lifetime was evaluated on the basis of the number of cycles at which the cell capacity became less than 60%.

In the case of lithium secondary cells, the charge cut-off voltage was set at 4.5 V, and the discharge cut-off voltage at 4.5 V. In the cases of nickel-zinc secondary cells and nickel-cadmium secondary cells, the charge cut-off voltage was set at 2.0 V, where the cells were charged at a rated current for a time corresponding to the theoretical capacity of the positive electrode, and discharged until the cut-off voltage came to be 1.0 V.

On the secondary cells of Examples, produced according to the present invention, and those of Comparative Example, produced not according to the present invention, their performance concerning the cycle lifetime was compared and evaluated as the ratio of the former to the latter to obtain the results shown in Table 1 together.

TABLE 1

| | |
|---|---|
| Cycle lifetime of Ex. 1/Cycle lifetime of Cp. 1: | 2.9 |
| Cycle lifetime of Ex. 2/Cycle lifetime of Cp. 1: | 3.0 |
| Cycle lifetime of Ex. 3/Cycle lifetime of Cp. 1: | 2.7 |
| Cycle lifetime of Ex. 4/Cycle lifetime of Cp. 4: | 1.5 |
| Cycle lifetime of Ex. 5/Cycle lifetime of Cp. 4: | 1.6 |
| Cycle lifetime of Ex. 6/Cycle lifetime of Cp. 4: | 1.8 |
| Cycle lifetime of Ex. 7/Cycle lifetime of Cp. 3: | 1.5 |
| Cycle lifetime of Ex. 8/Cycle lifetime of Cp. 2: | 2.5 |
| Cycle lifetime of Ex. 9/Cycle lifetime of Cp. 1: | 1.4 |
| Cycle lifetime of Ex. 10/Cycle lifetime of Cp. 3: | 1.3 |
| Cycle lifetime of Ex. 11/Cycle lifetime of Cp. 3: | 1.2 |
| Cycle lifetime of Ex. 12/Cycle lifetime of Cp. 5: | 2.5 |
| Cycle lifetime of Ex. 13/Cycle lifetime of Cp. 6: | 2.0 |

Ex.: Example;
Cp.: Comparative Example

As is seen from Table 1, the employment of the secondary cells making use of the negative electrode or positive electrode of the present invention brings about an elongation of the cycle lifetime in any of the lithium secondary cells, nickel-zinc secondary cells and nickel-cadmium secondary cells according to the present invention.

The results of evaluation of the energy density per unit area are shown in Table 2 as the ratio of that of the secondary cell of the present invention in each Example to that of the secondary cell of Comparative Example 3 or 4 in the case of secondary cells, as the ratio to that of the secondary cell of Comparative Example 5 in the case of nickel-zinc secondary cells, and as the ratio to that of the secondary cell of Comparative Example 6 in the case of nickel-cadmium secondary cells.

TABLE 2

| | |
|---|---|
| Energy density of Ex. 1/Energy density of Cp. 3: | 1.4 |
| Energy density of Ex. 2/Energy density of Cp. 3: | 1.6 |
| Energy density of Ex. 3/Energy density of Cp. 3: | 1.4 |
| Energy density of Ex. 4/Energy density of Cp. 4: | 1.1 |
| Energy density of Ex. 5/Energy density of Cp. 4: | 1.2 |
| Energy density of Ex. 6/Energy density of Cp. 4: | 1.2 |
| Energy density of Ex. 8/Energy density of Cp. 3: | 1.3 |
| Energy density of Ex. 9/Energy density of Cp. 3: | 1.3 |
| Energy density of Ex. 10/Energy density of Cp. 3: | 1.3 |
| Energy density of Ex. 11/Energy density of Cp. 3: | 1.2 |
| Energy density of Ex. 12/Energy density of Cp. 5: | 1.2 |
| Energy density of Ex. 13/Energy density of Cp. 6: | 1.2 |

Ex.: Example;
Cp.: Comparative Example

As is seen from Table 2, the employment of the secondary cells making use of the negative electrode of the present invention brings about an increase in energy density by 20 to 40% with respect to that of the lithium secondary cells employing carbon or graphite in the negative electrode, obtained by baking the resin.

As is also seen therefrom, in the case of the secondary cells of the present invention, employing in the positive electrode collector the metal having a great number of micropores, the energy density has increased by 20%; in the case of the nickel-zinc secondary cells, the energy density has increased by 20%; and in the case of the nickel-cadmium secondary cells, the energy density has increased by 15%.

To examine the discharge rate characteristics of the cells, they were discharged at currents of 1 C and 3 C on the basis of the electric capacity calculated from the mass of the positive electrode active material, to obtain the results as shown in Table 3.

TABLE 3

| | Discharged at: | |
|---|---|---|
| | 1C | 3C |
| Discharge capacity of Ex. 4/ Discharge capacity of Cp. 4: | 1.1 | 1.3 |
| Discharge capacity of Ex. 5/ Discharge capacity of Cp. 4: | 1.1 | 1.3 |
| Discharge capacity of Ex. 11/ Discharge capacity of Cp. 3: | 1.2 | 1.4 |
| Discharge capacity of Ex. 12/ Discharge capacity of Cp. 5: | 1.1 | 1.4 |
| Discharge capacity of Ex. 13/ Discharge capacity of Cp. 6: | 1.1 | 1.3 |

Ex.: Example;
Cp.: Comparative Example

As is seen from Table 3, the employment of the secondary cells making use of the negative electrode or positive electrode of the present invention brings about an improvement in 3 C discharge characteristics by 30 to 40%.

As is also seen from Table 3, the 3 C discharge characteristics can be improved by 40% in respect of the nickel-zinc secondary cells, and can be improved by 30% in respect of the nickel-cadmium secondary cells. That is, the secondary cell employing the electrode of the present invention, comprising the metal having micropores, is seen to have superior rapid discharge characteristics.

Thus, the application of the present invention makes it possible to produce superior secondary cells having a higher energy density and a longer cycle lifetime.

Advantages of the Invention

According to the present invention, it is possible to provide an electrode for a secondary cell, having a long cycle lifetime, a high-energy density and superior performances; a process for its production; and a secondary cell having such an electrode.

According to the present invention, it is also possible to provide an electrode that can prevent or control an increase in impedance of the negative electrode or positive electrode which may be caused by charging and discharging; a process for its production; and a secondary cell having such an electrode.

According to the present invention, it is still also possible to provide an electrode that can adhere to the active material and can be rapidly charged and discharged; a process for its production; and a secondary cell having such an electrode.

According to the present invention, in lithium secondary cells using as the collector, the metal having a great number of micropores formed in the direction from the surface to the inside on and in which the negative electrode active material is formed, peeling is prevented because of the adhesion ensured by the micropores, even if lithium is deposited or intercalated into the negative electrode, or turned into alloy to swell, in the course of discharging. By preventing the negative electrode impedance from satisfactory electron collecting ability can be retained and lithium secondary cells having a long increasing, and lithium secondary cells having a long cycle lifetime can be obtained. Also, the specific surface area of the negative electrode can be increased, and hence the effective current density of the negative electrode can be decreased, the growth of dendrite can be prohibited, and lithium secondary cells having a much longer cycle lifetime can be obtained. The decrease in effective current density of the negative electrode also makes it possible to obtain lithium secondary cells that can be rapidly charged and discharged at greater currents.

Meanwhile, the inside of the micropores of the porous metal having a great number of micropores of the present invention is filled with the positive electrode active material or the micropore surfaces of the porous metal are coated with the positive electrode active material. In the case of lithium secondary cells, this brings about a good adhesion between the positive electrode active material and the porous metal, and hence, the electrode has a superior electron collecting performance and the cell can be charged and discharged in a higher efficiency. The voltage drop can also be prevented when discharged at a high rate, and hence lithium secondary cells having a superior rapid discharging performance can be obtained. Also, like the above negative electrode, the specific surface area of the positive electrode can be made larger, and hence the effective current density of the positive electrode at the time when cells are charged and discharged can be decreased, and lithium secondary cells that can be rapidly charged and discharged can be obtained.

As additional advantages, when the oxidation-reduction treatment of the porous metal is further repeated, the microporous structure can be further advanced and the specific surface area and pore volume thereof can be further increased, and hence lithium secondary cells having a higher energy density can be obtained.

Also in the case of the secondary cells making use of the zinc negative electrode, like the above lithium secondary cells, the electrode itself of the present invention does not swell even when the metallic zinc is changed into zinc oxide at the time of discharging. The electrode itself may less shrink even when the zinc oxide is changed into metallic zinc at the time of charging, and hence it is possible to prevent an increase in impedance of the negative electrode which may be caused by a change in volume of the electrode, and secondary cells having a long cycle lifetime can be obtained.

As still additional advantages, when the pores of the metal having a great number of micropores of the present invention are filled with nickel hydroxide, the positive electrode for alkaline secondary cells, having a high packing density and a large specific surface area, can be obtained. In this case also, since the specific surface area can be made larger, the effective current density can be decreased, and since the electrode active material can be prevented from undergoing abrupt crystal changes when cells are rapidly charged and discharged, the cycle lifetime of the cells can be improved. Thus, the employment of the metal electrode of the present invention makes it possible to provide alkaline secondary cells having a high energy density and a long cycle lifetime.

Needless to say, the present invention is by no means limited to the foregoing Examples and descriptions, and may be appropriately modified and combined within the scope of the purport of the present invention.

What is claimed is:

1. A process for producing an electrode for a secondary cell comprising a collector, said process comprising a step of:

forming the collector by (a) oxidizing a metallic material containing a metal constituent and (b) reducing the metallic material to form a plurality of micropores having an average pore diameter not larger than 3 microns and having a primary orientation directed from a surface thereof toward an inside, whereby the collector has a specific surface area not smaller than 1 $m^2/g$ and is capable of retaining an active material which contributes to a cell reaction.

2. The process according to claim 1, further comprising a step of etching the metallic material before the reducing step (b).

3. The process according to claim 1, wherein the step of oxidation and the step of reduction are carried out plural times.

4. The process according to claim 1, wherein the step of reduction is carried out plural times.

5. The process according to claim 1, wherein the step of oxidation is applied to a metal foil or a metal plate.

6. The process according to claim 1, wherein the step of oxidation comprises a heat treatment carried out in an atmosphere selected from the group consisting of oxygen, ozone, water vapor and a gaseous halide.

7. The process according to claim 1, wherein the reducing step (b) is carried out at a temperature not higher than the melting point of the metal constituent.

8. The process according to claim 1, wherein the metallic material comprises a metal oxide, a metal halide or a metal nitride.

9. The process according to claim 1, wherein the step of reduction is carried out in an atmosphere of hydrogen gas.

10. The process according to claim 1, further comprising a step of retaining the active material on the collector.

11. The process according to claim 1, further comprising a step of providing an active material retaining layer which retains the active material on the collector.

12. The process according to claim 1, further comprising a step of applying a solution containing an organic resin or a cyclic hydrocarbon compound to a surface of the collector and thereafter drying and baking the collector, thereby providing a carbon layer on the collector.

13. The process according to claim 12, wherein the step of baking is carried out in an atmosphere comprising an inert gas and hydrogen.

14. The process according to claim 13, wherein said baking is carried out at a temperature ranging from 600° C. to 1,000° C.

15. The process according to claim 1, wherein the micropores have a primary orientation perpendicular or substantially perpendicular to the main plane of the collector.

16. The process according to claim 1, wherein the collector has a resistivity not larger than $2\times10^{-5}$ Ω·cm at 20° C.

17. The process according to claim 1, wherein the metal is selected from the group consisting of copper, nickel, iron, titanium, tungsten, molybdenum, chromium, platinum, tin, aluminum, zinc and cadmium.

18. The process according to claim 1, wherein the active material is lithium.

19. The process according to claim 1, wherein the active material is zinc.

* * * * *

UNITED STATES PATENT AND TRADEMARK OFFICE
CERTIFICATE OF CORRECTION

PATENT NO. : 6,558,848 B1
DATED : May 6, 2003
INVENTOR(S) : Naoya Kobayashi et al.

It is certified that error appears in the above-identified patent and that said Letters Patent is hereby corrected as shown below:

Column 3,
Line 27, "an active" should read -- an electrochemcially active --.
Line 28, "pertaining to" should read -- participating in the --.

Column 4,
Line 2, "collector" should read -- collector(s) --.
Line 3, "(s)" should be deleted.

Column 6,
Line 54, "provides of" should read -- provides --.

Column 7,
Lines 17 and 42, "other" should read -- another --.

Column 9,
Line 30, "solution is" should read -- solution are --.

Column 10,
Line 31, "electrode," should read -- electrodes, --.
Line 40, "More" should be deleted.

Column 13,
Line 32, "Aa" should read -- As --.

Column 18,
Line 38, "a insulating" should read -- an insulating --.

UNITED STATES PATENT AND TRADEMARK OFFICE
CERTIFICATE OF CORRECTION

PATENT NO.    : 6,558,848 B1
DATED         : May 6, 2003
INVENTOR(S)   : Naoya Kobayashi et al.

It is certified that error appears in the above-identified patent and that said Letters Patent is hereby corrected as shown below:

Column 20,
Line 1, "100 μm" should read -- 100 μm. --.

Signed and Sealed this

Eighteenth Day of November, 2003

JAMES E. ROGAN
*Director of the United States Patent and Trademark Office*